(12) United States Patent
Kiyose (10) Patent No.: US 10,298,783 B2
(45) Date of Patent: May 21, 2019

(54) DELIVERY MANAGEMENT SYSTEM

(71) Applicant: KYOCERA Document Solutions Inc., Osaka-shi, Osaka (JP)

(72) Inventor: Kenji Kiyose, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/577,364

(22) PCT Filed: May 23, 2016

(86) PCT No.: PCT/JP2016/065183
§ 371 (c)(1),
(2) Date: Nov. 28, 2017

(87) PCT Pub. No.: WO2016/194681
PCT Pub. Date: Dec. 8, 2016

(65) Prior Publication Data
US 2018/0159991 A1 Jun. 7, 2018

(30) Foreign Application Priority Data

May 29, 2015 (JP) .................................. 2015-110279

(51) Int. Cl.
*H04N 1/00* (2006.01)
*G03G 21/00* (2006.01)
(Continued)

(52) U.S. Cl.
CPC ......... *H04N 1/00212* (2013.01); *G03G 21/00* (2013.01); *G06F 3/0488* (2013.01);
(Continued)

(58) Field of Classification Search
CPC ........... H04N 1/00214; H04N 1/00127; G06Q 10/083; G06Q 10/08; G06Q 20/322
(Continued)

(56) References Cited

U.S. PATENT DOCUMENTS 6,285,916 B1 * 9/2001 Kadaba .................. G06K 17/00
235/375
2005/0277405 A1 * 12/2005 Noguchi ............ H04N 1/00127
455/411
(Continued)

FOREIGN PATENT DOCUMENTS

| JP | 2009252041 A | 10/2009 |
|---|---|---|
| JP | 2010026990 A | 2/2010 |
| JP | 2014044519 A | 3/2014 |

*Primary Examiner* — Jamares Q Washington
(74) *Attorney, Agent, or Firm* — Viering, Jentschura & Partner MBB (57) ABSTRACT

A delivery management system includes a multifunction peripheral for forming an image, a server communicable with the multifunction peripheral, and mobile terminal devices communicable with the server. The server includes an authorization unit and an image data generation unit. The authorization unit grants the mobile terminal devices data disclosure rights on the basis of delivery-related data, which has been received by a receiving unit. The image data generation unit generates image data on the basis of the delivery-related data received by the receiving unit. A mobile terminal device transmitting unit transmits, to the server, delivery image data read by a mobile terminal device image reading unit. A notifying unit notifies the delivery-related data that is transmitted from the server on the basis of the data disclosure rights granted to the mobile terminal devices.

4 Claims, 11 Drawing Sheets

(51) Int. Cl.
　　　*G06F 3/0488*　　　(2013.01)
　　　*H04L 12/58*　　　(2006.01)
　　　*H04N 1/32*　　　(2006.01)
　　　*G06Q 10/08*　　　(2012.01)
(52) U.S. Cl.
　　　CPC ........... *G06Q 10/083* (2013.01); *H04L 51/24* (2013.01); *H04N 1/32411* (2013.01)
(58) Field of Classification Search
　　　USPC .......................................... 358/1.15; 709/203
　　　See application file for complete search history.

(56) References Cited

U.S. PATENT DOCUMENTS

| | | | |
|---|---|---|---|
| 2011/0228337 A1* | 9/2011 | Shikano | ............... B42D 15/006 358/1.15 |
| 2014/0197233 A1* | 7/2014 | Huguley | .......... G06K 19/06037 235/375 |

\* cited by examiner

| USER INFORMATION | 46a | 46b | 45 |
|---|---|---|---|
| USER NAME | X | Y | ... |
| ID | $A_1$ | $B_1$ | ... |
| PASSWORD | $A_2$ | $B_2$ | ... |
| ADDRESS DATA 1 | $A_3$ | $B_3$ | ... |
| ADDRESS DATA 2 | $A_4$ | $B_4$ | ... |
| TELEPHONE NUMBER DATA | $A_5$ | $B_5$ | ... |
| EMAIL ADDRESS DATA | $A_6$ | $B_6$ | ... |
| AVATAR | 47a | 47b | ... |

DELIVERY MANAGEMENT SYSTEM

RELATED APPLICATIONS

The present application is a national stage entry according to 35 U.S.C. § 371 of PCT application No.: PCT/JP2016/065183 filed on May 23, 2016, which claims priority from Japanese application No.: 2015-110279 filed on May 29, 2015 and is incorporated herein by reference in its entirety.

TECHNICAL FIELD

The present invention is related to a delivery management system.

BACKGROUND ART

In an image forming device, which is typified by a multifunction peripheral or the like, an image of an original document is read out by an image reading unit, and then, a photoreceptor provided to an image forming unit is irradiated with light on the basis of the readout image to form an electrostatic latent image on the photoreceptor. Thereafter, after a developer, such as a toner or the like, which has been charged, is fed onto the formed electrostatic latent image to form a visible image, the visible image is transferred to a sheet of paper and is fixed and the sheet of paper is discharged to the outside of the apparatus.

There is a case in which an image forming device is used for a delivery management system. For example, Japanese Laid-open Patent Publication No. 2010-26990 (Patent Literature 1) describes a technology related to an image forming device which prints a collection invoice and a delivery invoice in a delivery procedure of delivering a package.

CITATION LIST

Patent Literature

Patent Literature 1: Japanese Laid-open Patent Publication No. 2010-26990

SUMMARY OF INVENTION

Technical Problem

In recent net auctions, there is a case in which a sending source that sends goods and a sending destination that receives the goods are not directly acquainted with each other and the goods are sent. In this case, information of a name or an address of a user of a sending source and information of a name or an address of a use of a sending destination are so-called individual information, and there are many requests for not disclosing such individual information to an unspecified large number of people if possible. That is, in delivering goods, individual information is desired to be concealed as much as possible.

On the other hand, there is a case in which a user of a sending destination desires to check whether or not goods have been reliably sent from a user of a sending source. The technology described in Patent Literature 1 cannot address such cases.

It is therefore an object of the present disclosure to provide a delivery management system which enables increase in secrecy of individual information and reliable delivery of goods.

Solution to Problem

In an aspect of the present disclosure, a delivery management system includes an image forming device that forms an image, a server that is communicable with the image forming device, and a mobile terminal device that is communicable with the server. The delivery management system delivers a delivery article from a user of a sending source to a user of a sending destination. The image forming device includes an input unit, an image forming device transmitting unit, an image forming device receiving unit, and a printing unit. The delivery-related data is input via the input unit. The image forming device transmitting unit transmits the delivery-related data which has been input to the input unit to the server. The image forming device receiving unit receives image data that is transmitted from the server. The printing unit forms a delivery image on the basis of the image data which has been received by the receiving unit and prints a delivery report of the delivery article. The server includes a server receiving unit, an authentication unit, a storage unit, an authorization unit, an image data generation unit, and a server transmitting unit. The server receiving unit receives data that is transmitted from the image forming device and the mobile terminal device. The authentication unit authenticates an access from the image forming device and the mobile terminal device. The storage unit stores data related to a user. The authorization unit grants the mobile terminal device a data disclosure right on the basis of the delivery-related data which has been received by the receiving unit. The image data generation unit generates image data on the basis of the delivery-related data which has been received by the receiving unit. The server transmitting unit transmits data to the image forming device and the mobile terminal device. The mobile terminal device includes a mobile terminal device image reading unit, a mobile terminal device image transmitting unit, a mobile terminal device image receiving unit, and a notifying unit. The mobile terminal device image reading unit reads the delivery image. The mobile terminal device image transmitting unit transmits image data of the delivery image which has been read by the mobile terminal device image reading unit to the server. The mobile terminal device image receiving unit receives data that is transmitted from the server. The notifying unit notifies the delivery-related data which is transmitted from the server on the basis of the data disclosure right granted to the mobile terminal device.

Advantageous Effects of Invention

Using the delivery management system, the server receives delivery-related data which has been input to the input unit included in the image forming device and has been transmitted, grants the mobile terminal device a data disclosure right on the basis of the delivery-related data, and generates image data on the basis of the delivery-related data. Then, the generated image data is transmitted to the image forming device. The image forming device forms an image on the basis of the image data which has been received and prints a delivery report. A delivery company which owns the mobile terminal device reads the image data and accesses the serve so that disclosure contents of data in accordance with a data disclosure right is disclosed, and thereby, the delivery company delivers the delivery article to the user of a sending destination. In this case, the delivery-related data is printed as image data, and therefore, even when a third person looks at the image data, the third person cannot know individual information, such as a user name or the like. Also, the delivery article is delivered to the user of a sending destination with the disclosure contents in accordance with the disclosure right granted to the delivery company, and therefore, detailed individual information is not unnecessarily disclosed to the delivery company, so that the delivery article may be reliably delivered to the user of a sending destination. Therefore, using the delivery management system, secrecy of individual information may be increased and goods may be reliably delivered.

DESCRIPTION OF EMBODIMENT

Figure 1:
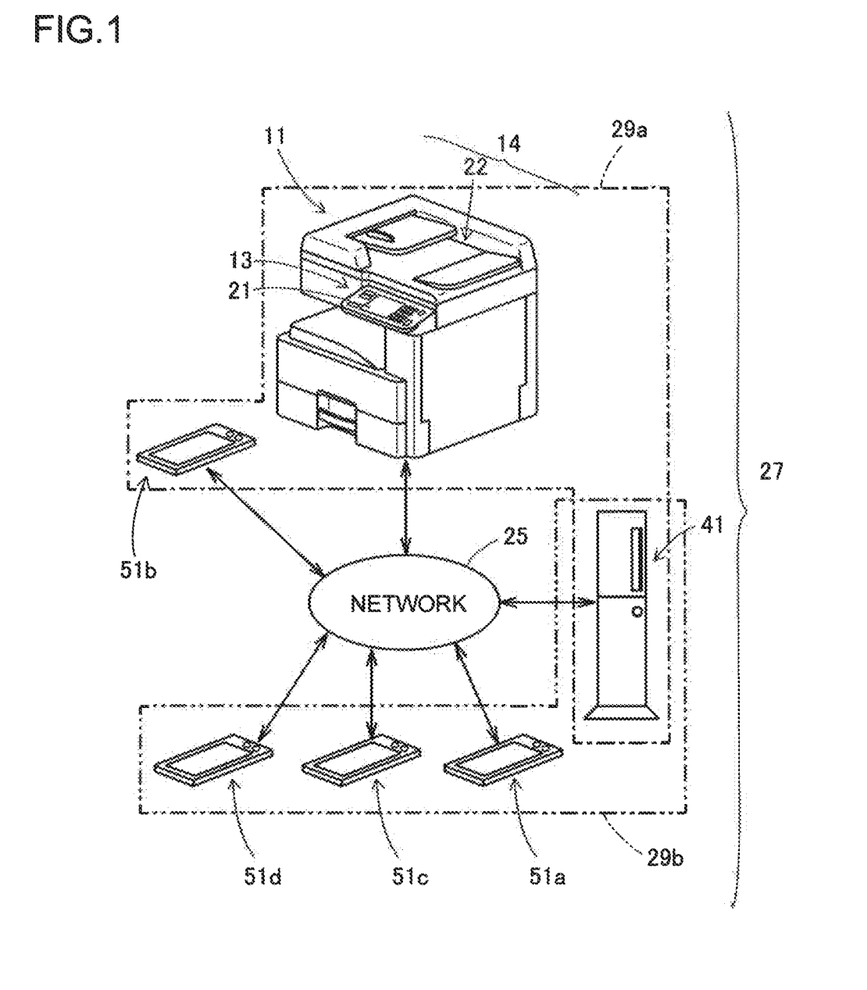
FIG. 1 is a schematic view illustrating a delivery management system according to an embodiment of the present disclosure.
Figure 2:
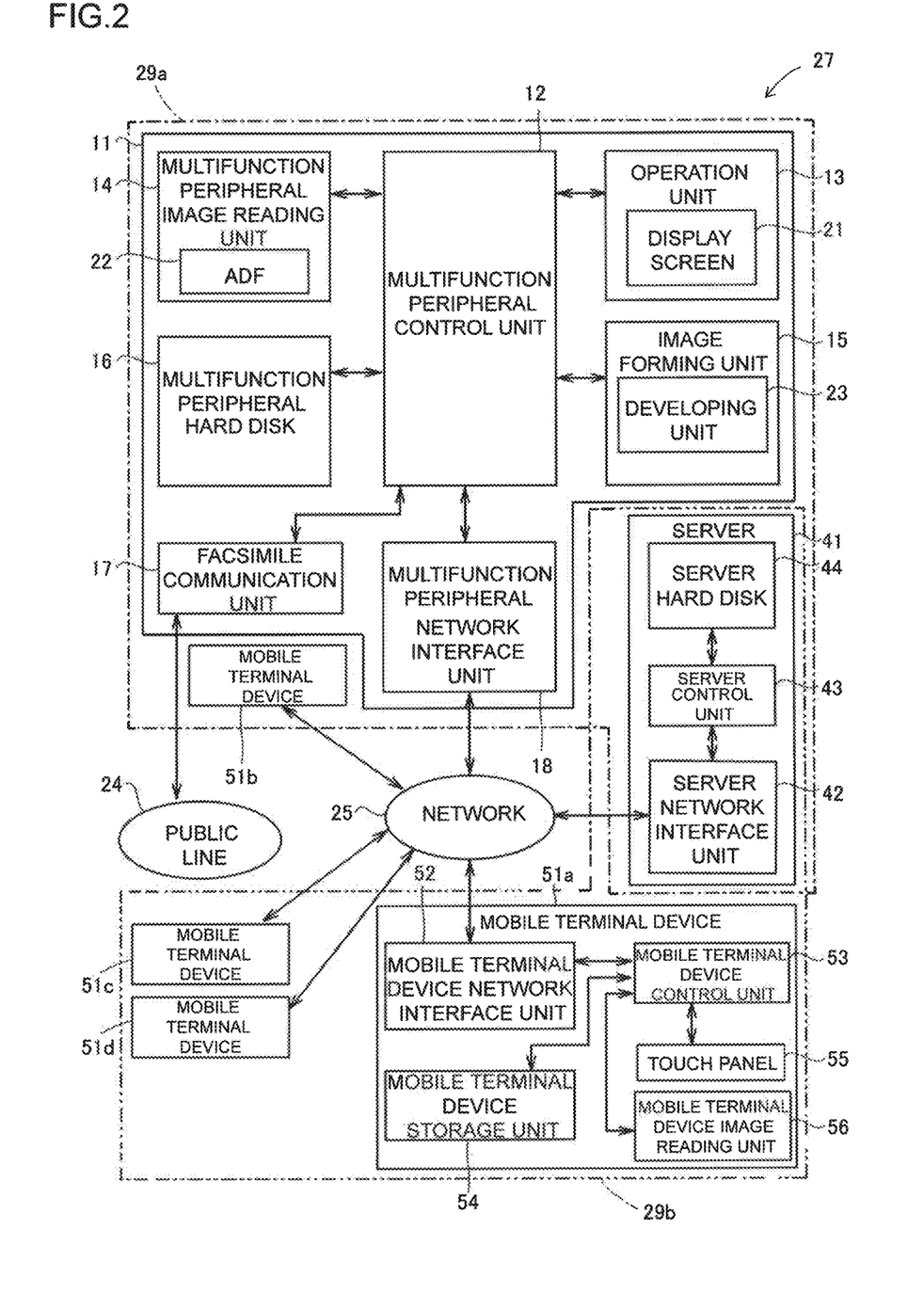
FIG. 2 is a block diagram illustrating a configuration of the delivery management system illustrated in FIG. 1.
Figure 3:
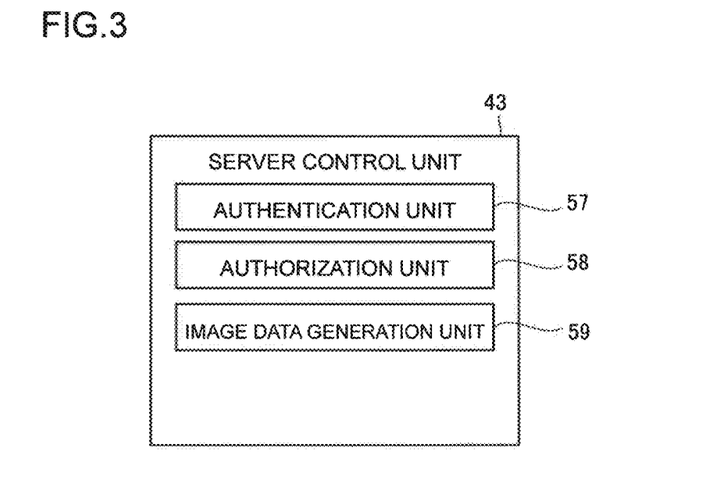
FIG. 3 is a block diagram illustrating a configuration of a server control unit.

Embodiments of the present disclosure will be described below. FIG. 1 is a view illustrating a delivery management system according to an embodiment of the present disclosure. FIG. 2 is a block diagram illustrating a configuration of a delivery management system according to the embodiment. FIG. 3 is a block diagram illustrating a configuration of a server control unit included in a server.

With reference to FIG. 1 to FIG. 3, a delivery management system 27 according to the embodiment of the present disclosure includes a multifunction peripheral 11, a server 41, and four mobile terminal devices 51a, 51b, 51c, and 51d. The multifunction peripheral 11 and the server 41 are able to communicate data with one another via a network 25. The server 41 and each of the mobile terminal devices 51a to 51d are able to communicate data with one another via the network 25.

Note that the multifunction peripheral 11 is installed, for example, in a convenience store or the like where a sending source user goes. The server 41 is installed, for example, in an office of a management company that manages the delivery management system 27, or the like. The first mobile terminal device 51a is, for example, a smartphone which is owned by a sending destination user. The second mobile terminal device 51b is, for example, a note personal computer (PC) which is owned by a store clerk at a convenience store. The third and fourth mobile terminal devices 51b and 51c are, for example, tablet PCs that are owned by first and second delivery companies, respectively.

In the delivery management system 27, a configuration that is used before delivering a delivery article Z is started is illustrated in a part 29a indicated by an alternate long and short dash line. Also, in the delivery management system 27, a configuration that is used after delivering the delivery article Z is started is illustrated in a part 29b indicated by an alternate long and two short dashes line.

With reference to FIG. 1 to FIG. 3, the multifunction peripheral 11 included in the delivery management system 27 includes a multifunction peripheral control unit 12, an operation unit 13, a multifunction peripheral image reading unit 14, an image forming unit 15, a multifunction peripheral hard disk 16 serving as a storage unit, a facsimile communication unit 17, and a multifunction peripheral network interface unit 18 that provides a connection with the network 25.

The multifunction peripheral control unit 12 performs control of the entire multifunction peripheral 11. The operation unit 13 includes a display screen 21 that displays information that is transmitted from a multifunction peripheral 11 side and contents that are input by a user. Conditions, such as the number of print copies, gradation, or the like for image forming and on or off of a power source are input via the operation unit 13. The multifunction peripheral image reading unit 14 includes an auto document feeder (ADF) 22 that automatically conveys an original document that has been set to a reading unit. The multifunction peripheral image reading unit 14 reads image data of the original document. The image forming unit 15 includes a developing unit 23 that performs development using a toner. The image forming unit 15 forms an image on the basis of the image data of the original document that has been read or the image data that has been transmitted via the network 25. The multifunction peripheral hard disk 16 stores image data that has been transmitted, image forming conditions that have been input, or the like. The facsimile communication unit 17 is coupled to a public line 24 and performs facsimile transmission or facsimile reception.

Note that the multifunction peripheral 11 includes a dynamic random access memory (DRAM) to or from which image data is written or read, a sheet conveying unit that conveys a sheet of paper, or the like, but illustration and description of these components are omitted. Each of arrows in FIG. 2 indicates a flow of a control signal, control, or data related to an image.

The multifunction peripheral 11 forms an image in the image forming unit 15 using an original document that has been read by the multifunction peripheral image reading unit 14 and thereby operates as a copying machine. Also, the multifunction peripheral 11 forms an image in the image forming unit 15 using image data that has been transmitted from the server 41 coupled to the network 25 via the multifunction peripheral network interface unit 18, prints the formed image on a sheet of paper, and thereby, operates as a printer. That is, the image forming unit 15 operates as a printing unit that prints an image that has been requested. Also, the multifunction peripheral 11 forms an image in the image forming unit 15 via the DRAM using image data that has been transmitted from the public line 24 via the facsimile communication unit 17 and also transmits image data of an original document that has been read by the multifunction peripheral image reading unit 14 to the public line 24 via the facsimile communication unit 17, and thereby, operates as a facsimile device. That is, the multifunction peripheral 11 has a plurality of functions, such as a copy function, a printer function, a facsimile function, or the like, related to image processing. Furthermore, the multifunction peripheral 11 has functions of performing detailed setting for each of the above-described functions.

The server 41 includes a server network interface unit 42 that operates as a server transmitting unit and a server receiving unit to provide a connection to the network 25, a server control unit 43 that controls the entire server 41, and a server hard disk 44 that operates as a server storage unit that stores data. The server 41 is a so-called data base server and stores various types of data. The server 41 is a type of computer. The server 41 is provided so as to be communicable with the multifunction peripheral 11 and the mobile terminal devices 51a to 51d via the network 25 using the server network interface unit 42. The server control unit 43 includes an authentication unit 57 that authenticates accesses from the multifunction peripheral 11 and the mobile terminal devices 51a to 51d, an authorization unit 58 that grants the mobile terminal devices 51a to 51d data disclosure rights on the basis of delivery-related data, and an image data generation unit 59 that generates image data on the basis of the delivery-related data.

The first mobile terminal device 51a includes a mobile terminal device network interface unit 52 that operates as a mobile terminal device transmitting unit and a mobile terminal device receiving unit and provides a connection to the network 25, a mobile terminal device control unit 53 that performs control of the entire first mobile terminal device 51a, a mobile terminal device storage unit 54, a touch panel 55 that serves as a notifying unit including a display unit and an input unit, and a mobile terminal device image reading unit 56. The touch panel 55 functions as an interface that performs display of acquired data and input of data from a user on the basis of a touch panel function. The mobile terminal device image reading unit 56 includes a camera function, which is not illustrated, and is able to photograph an image of, for example, a two-dimensional bar code or the like by the camera function to capture the image, and read image data. The first mobile terminal device 51a is provided so as to be communicable with the server 41 via the network 25 using the mobile terminal device network interface unit 52. Note that each of the second mobile terminal device 51b, the third mobile terminal device 51c, and the fourth mobile terminal device 51d has the same basic configuration as that of the first mobile terminal device 51a, and therefore, the description thereof will be omitted.

Each of the mobile terminal devices 51a to 51d is of a size which allows each user to easily carry the corresponding one of the mobile terminal devices 51a to 51d. Each of the mobile terminal devices 51a to 51d is mainly operated using the touch panel 55. Examples of the mobile terminal devices 51a to 51d include, for example, a mobile phone, a smartphone, a tablet PC, a note PC, or the like. Note that the mobile terminal devices 51a to 51d can also perform transmission and reception of an email with the server 41.

Figure 4:
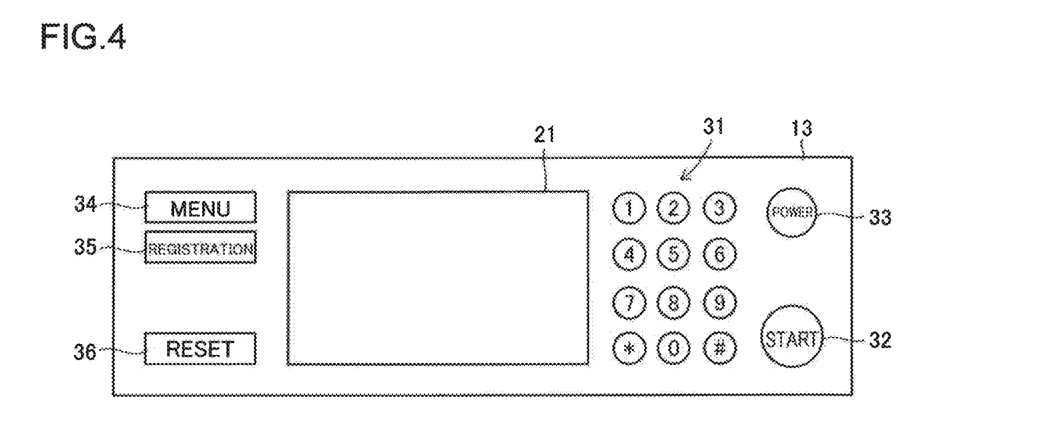
FIG. 4 is an appearance view illustrating a schematic configuration of an operation unit of a multifunction peripheral.

Next, a configuration of the operation unit 13 included in the multifunction peripheral 11 described above will be described further in detail. FIG. 4 is an appearance view illustrating a schematic configuration of the operation unit 13. With reference to FIG. 4, the operation unit 13 includes a numeric keypad 31 that is used for inputting numbers 0 to 9 and signs, such as "*", "#", or the like, which are used for inputting the number of print copies or the like, a start key 32 that is used for instructing start of printing or start of facsimile transmission, a power key 33 that is used for inputting on or off of the power source of the multifunction peripheral 11, a menu key 34 that is used for instructing selection of the printer function, the copy function, or the like of the multifunction peripheral 11, a registration key 35 that is used for instructing registration of various conditions for image forming or a user, a reset key 36 that is used for cancelling contents of an instruction that has been input by the user using the numeric keypad 31 or the like, and the display screen 21 described above. The display screen 21 has a liquid crystal touch panel function, and input of image forming conditions or the like, selection of a function, or the like may be performed also via the display screen 21 by a pressing force applied by a finger of the user or the like.

Figure 5:
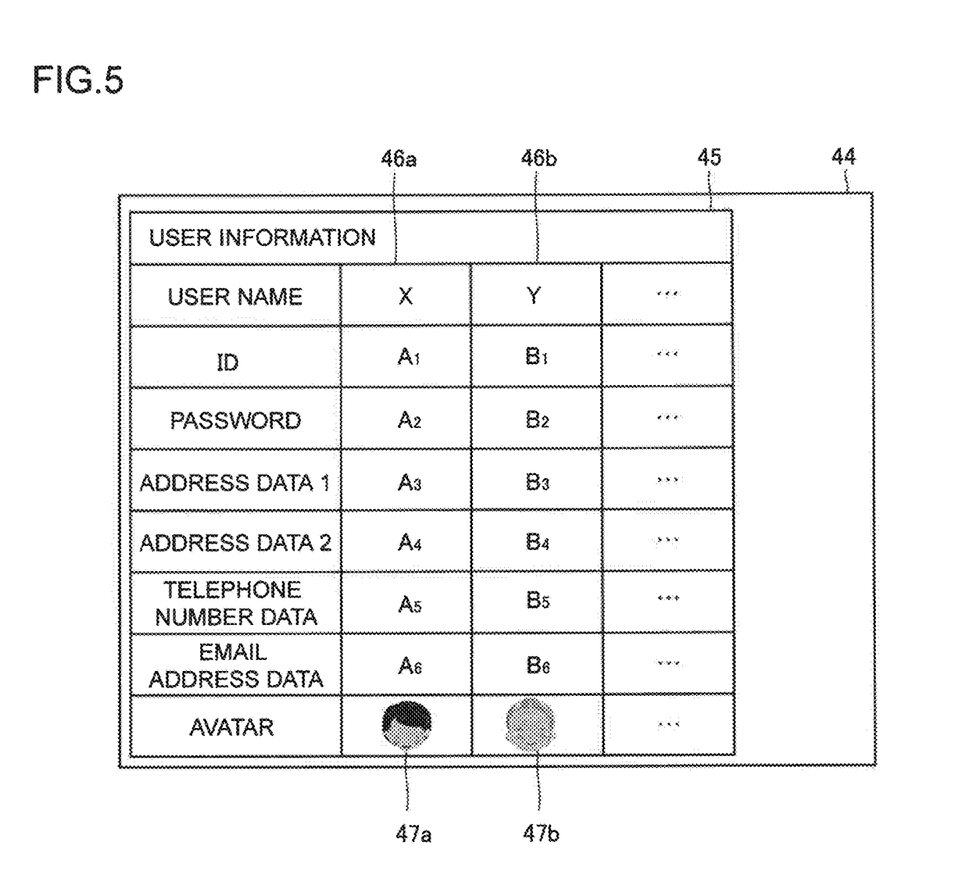
FIG. 5 is a diagram illustrating contents of data which are stored in a server hard disk of a server.

Next, contents of data that is stored in the server hard disk 44 included in the server 41 will be described in detail. FIG. 5 is a conceptual diagram illustrating a part of contents of data that is stored in the server hard disk 44.

With reference to FIG. 5, data related to a user is stored in a storage area 45 of the server hard disk 44. Specifically, for example, as data 46a related to a user X, ID data "A1", a password "A2", address data 1 "A3", address data 2 "A4", telephone number data "A5", and e-mail address data "A6" are stored and, as image information, avatar face image data 47a of the user X is stored. Also, as data 46b related to a user Y, ID data "B1", a password "B2", address data 1 "B3", address data 2 "B4", telephone number data "B5", and e-mail address data "B6" are stored and, as image information, avatar face image data 47b of the user Y is stored. The avatar face image data 47a and the avatar face image data 47b are set by the user X and the user Y themselves or are arbitrarily set.

In this case, as the address data 1, rough address data, such as a prefecture, a city, a town, a village, or the like in address data, is stored. It is not possible to know a detailed address, that is, for example, an address including a street number, by only looking at the address data 1. On the other hand, as the address data 2, data of a street number in address data is stored. That is, it is possible to know the addresses of the users X and Y by looking at both of the address data 1 and the address data 2.

Note that data of a delivery company is also stored in the server hard disk 44. Specifically, delivery service areas of a delivery company W and a delivery company V, IDs of the mobile terminal devices 51c and 51d owned by the delivery companies, or the like are stored.

Next, a case in which a delivery article Z is delivered from the user X of a sending source to the user Y of a sending destination via the first delivery company W and the second delivery company V using the delivery management system 27 according to the embodiment of the present disclosure will be described. It is assumed that the user Y of the sending destination owns the first mobile terminal device 51a, a store clerk T at a convenience store owns the second mobile terminal device 51b, the first delivery company W owns the third mobile terminal device 51c, and the second delivery company V owns the fourth mobile terminal device 51d. First, a flow of processing in an operation before delivering the delivery article Z is started, which is illustrated in the part 29a, will be described.

Figure 6:
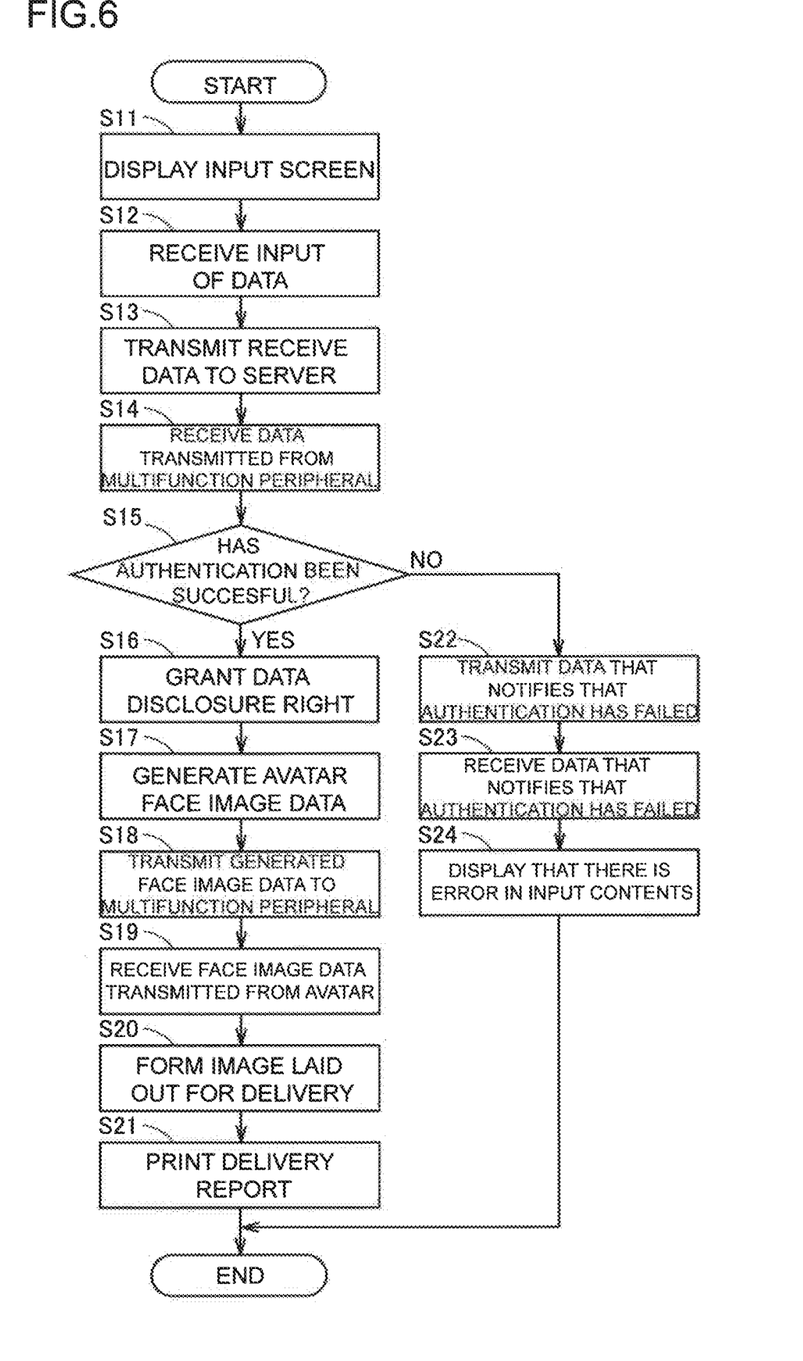
FIG. 6 is a flowchart illustrating contents of processing when a delivery report is printed.

FIG. 6 is a flowchart illustrating contents of processing when a delivery report is printed. With reference to FIG. 1 to FIG. 6, the user X carries the delivery article Z that is delivered to the user Y and goes to a place in which the multifunction peripheral 11 is installed. The user X presses down a predetermined key or the like of the operation unit 13 of the multifunction peripheral 11 to cause a screen that is used for inputting items that are necessary for delivery to be displayed on the display screen 21 of the operation unit 13 in order to input delivery-related data (in FIG. 6, Step S11, and "Step" will be hereinafter omitted).

Figure 7:
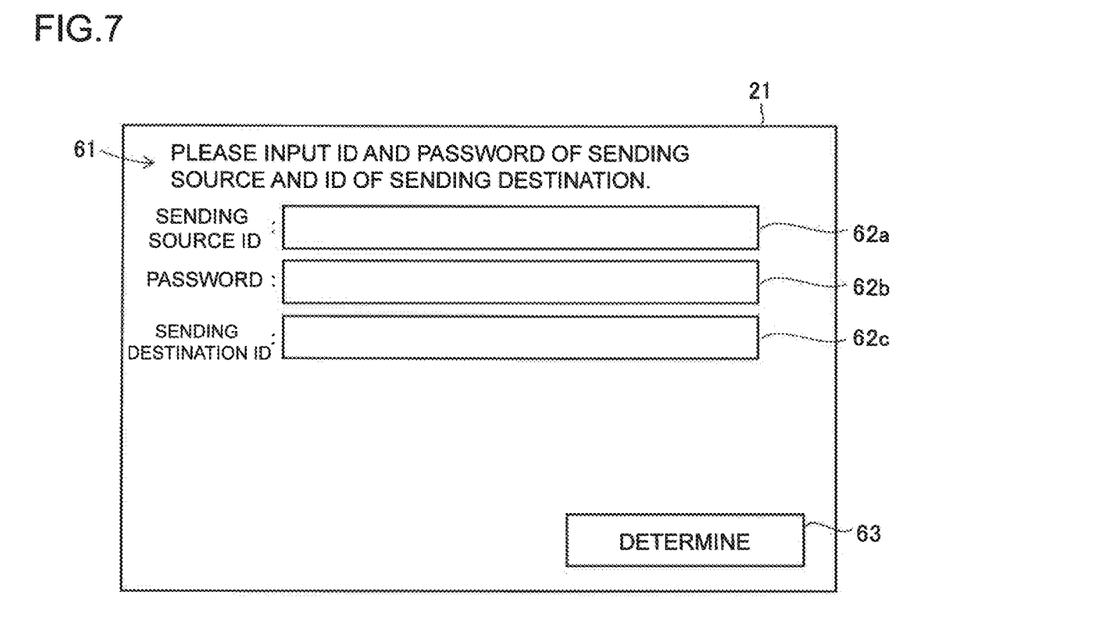
FIG. 7 is a diagram illustrating an example of a display screen of an operation unit.

FIG. 7 is a diagram illustrating an example of the display screen 21 of the operation unit 13. With reference to FIG. 7, a message 61 "PLEASE INPUT ID AND PASSWORD OF SENDING SOURCE AND ID OF SENDING DESTINATION.", a sending source ID input unit 62a that operates as an input unit and is used for inputting a sending source ID, a password input unit 62b that is used for inputting a password, a sending destination ID input unit 62c that is used for inputting a sending destination ID, and a determination key 63 that is used for determining input are indicated on the display screen 21 of the operation unit 13.

In this case, the user X inputs delivery-related data. Specifically, the user X inputs an ID of the user X that serves as a sending source in the sending source ID input unit 62a using the numeric keypad 31 or the like, a password in the sending source password input unit 62b, an ID of a sending destination in the sending destination ID input unit 62c. After determining input by pressing down the determination key 63, the multifunction peripheral control unit 12 receives delivery-related data, which has been input in the sending source ID input unit 62a or the like (S12).

Then, the multifunction peripheral control unit 12 transmits the data of the ID of the sending source or the like, which has been input, to the server 41 via the network 25 (S13). The server 41 receives the data of the ID of the sending source or the like (S14).

The server 41 determines, after receiving the data of the ID of the sending source or the like, whether or not the password that has been input is correct. That is, the authentication unit 57 included in the server control unit 43 performs authentication of the password that has been input (S15). Specifically, whether or not, for the ID, a password that has been stored in the server hard disk 44 matches and, if the password matches, the authentication unit 57 determines that authentication has been successful. Note that, in the following, authentication when accesses to the server 41 from the first to fourth mobile terminal devices 51a to 51d are made is similarly performed.

If authentication of the password has been successful (YES in S15), first, the authorization unit 58 included in the server control unit 43 grants the mobile terminal devices 51a to 51d data disclosure rights on the basis of the delivery-related data that has been received (S16). Specifically, for the mobile terminal device 51a owned by the user Y of the sending destination, disclosure of data of the ID and the user name of the user X of the sending source is permitted in order to check the sending source. Also, for the mobile terminal device 51b owned by the store clerk T at the convenience store, disclosure of the address data 1 of the user X of the sending source and the address data 2 of the user Y of the sending destination is permitted in order to calculate of a delivery fee. For the mobile terminal device 51c owned by the first delivery company W the delivery service area of which includes the address of the user X of the sending source, disclosure of the address data 1 of the user Y of the sending destination is permitted and, in order to make an inquiry during delivery, disclosure of the ID data and the telephone number data of the user X of the sending source is permitted. For the mobile terminal device 51d owned by the second delivery company V the delivery service area of which includes the address of the user Y of the sending destination, disclosure of the address data 1, the address data 2, and the ID data of the user Y of the sending destination is permitted and, in order to make an inquiry during delivery, disclosure of the telephone number data of the user Y and the ID data and the telephone number data of the user X of the sending source is permitted. Note that, for the delivery companies W and V, in addition to the above-described data, disclosure of data of a desired delivery time is also permitted.

Next, the image data generation unit 59 included in the server control unit 43 generates image data, on the basis of the delivery-related data. In this case, an avatar face image for a report is processed and is thus generated (S17). Specifically, for the avatar face image data 47a of a sending source, an image to which information, such as a generation time, that is, an issuance time of a report, or an invoice number, which had been processed at random, has been added is newly generated. Note that this image is called one time image. Also, the avatar face image 47b of a sending destination is kept as it is.

Figure 8:
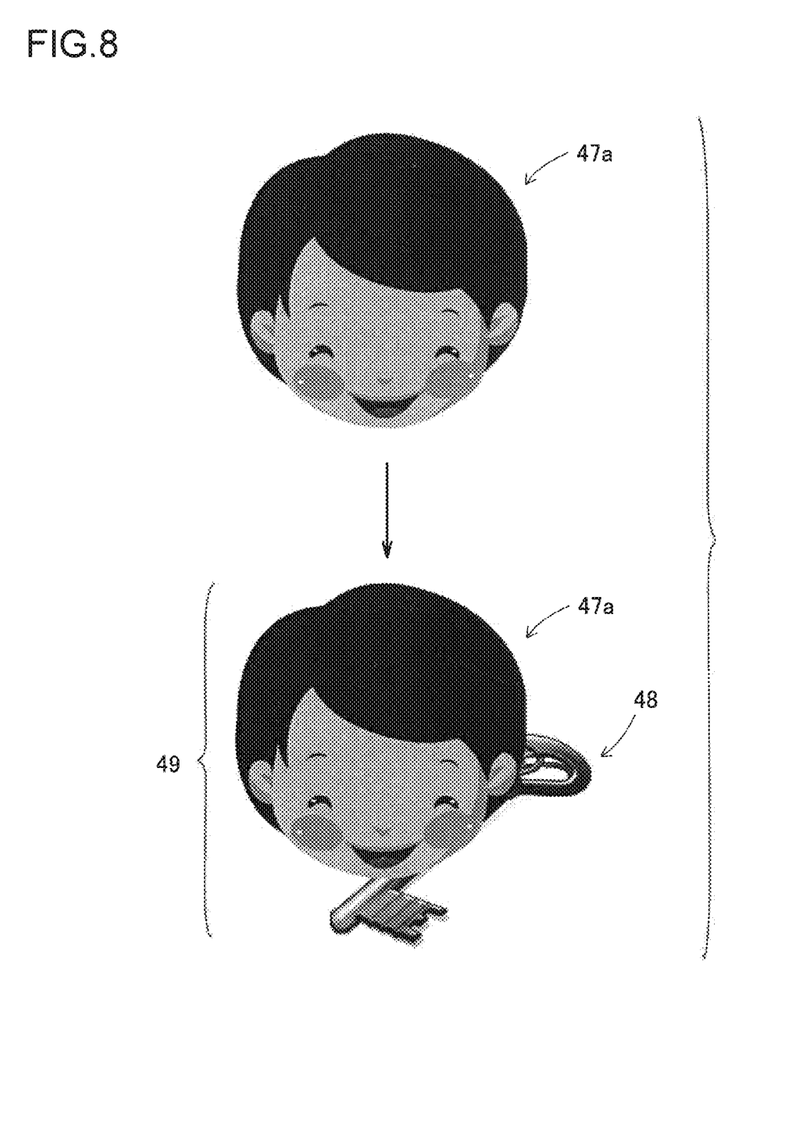
FIG. 8 is a view illustrating an avatar face image of a sending source and a generated avatar face image of a sending source.

FIG. 8 is a view illustrating the avatar face image of the sending source and a generated avatar face image 49 of the sending source. With reference to FIG. 8, for the avatar face image data 47a of the sending source, the avatar face image 49 for a report is generated by taking in an image 48 of a key in a background and combining the image 48 with the avatar face image data 47a. In this case, a part corresponding to the avatar face image data 47a of the sending source is used as it is.

Thereafter, in order to print a report, data of the generated avatar face image 49 of the sending source and data of the avatar face image 47b of the sending destination are transmitted to the multifunction peripheral 11 (S18). That is, image data including the delivery-related data is transmitted from the server 41 to the multifunction peripheral 11. The multifunction peripheral 11 receives data of the avatar face image 49 and the data of the avatar face image 47b which have been transmitted (S19).

The multifunction peripheral 11 forms an image by the image forming unit 15 along a layout of a delivery report on the basis of the data of the avatar face image 49 and the data of the avatar face image 47b which have been received (S20). Then, the formed image is printed on a sheet of paper as a report (S21).

Figure 9:
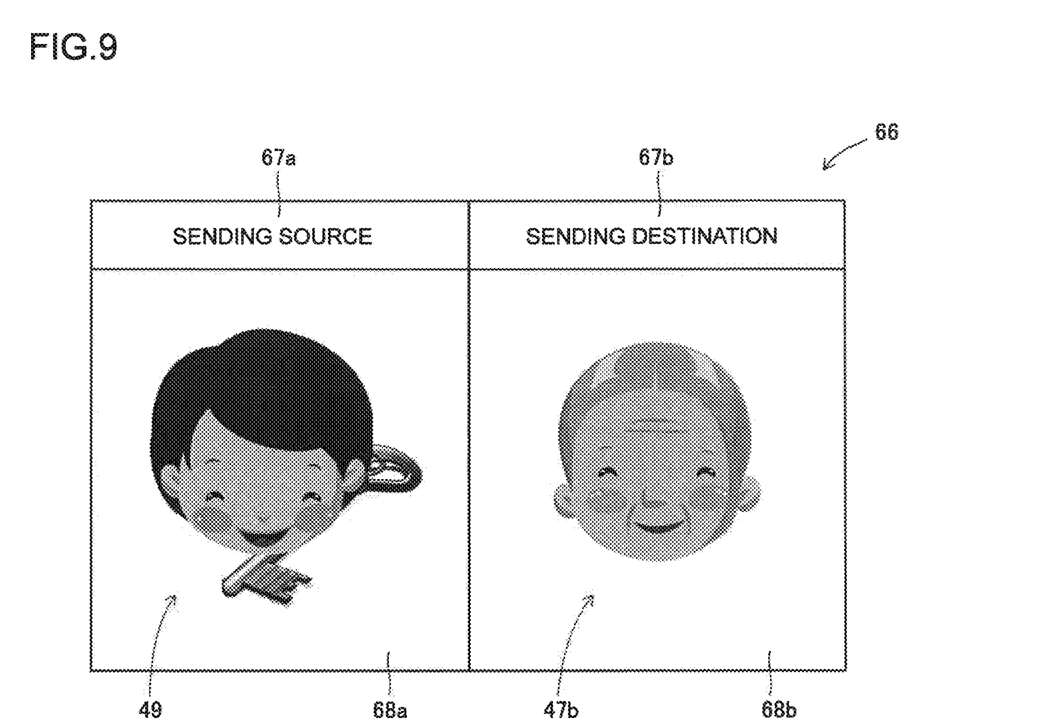
FIG. 9 is a view illustrating a report attached to a delivery article.

As described above, a report is printed. The printed report is attached to a surface of the delivery article Z. FIG. 9 is a view illustrating a report attached to the delivery article Z. With reference to FIG. 9, a printed report 66 is attached to the surface of the delivery article Z. A display 67a indicating the sending source, a display 67b indicating the sending destination, a column 68a in which the avatar face image 49 of the sending source is printed, and a column 68b in which the avatar face image 47b of the sending destination is printed are on the surface of the report 66. The avatar face image 49 of the sending source is printed in the column 68a and the avatar face image 47b of the sending destination is printed in the column 68b.

Note that, for the avatar face images 49 and 47b, as a matter of course, even when a third person looks at the images, the third person cannot know individual information, such as the names and the addresses of the sending source and the sending destination. That is, secrecy of individual information is high at the time of delivery.

Note that, if authentication of the password has not been successful (NO in S15), data that notifies that authentication has failed is transmitted from the server 41 to the multifunction peripheral 11 (S22). The multifunction peripheral 11 receives the data that notifies that authentication has failed (S23). Then, it is indicated by the display screen 21 that the password that has been input is wrong (S24). The user X looks at the display, inputs again a correct password, and performs procedures.

Figure 10:
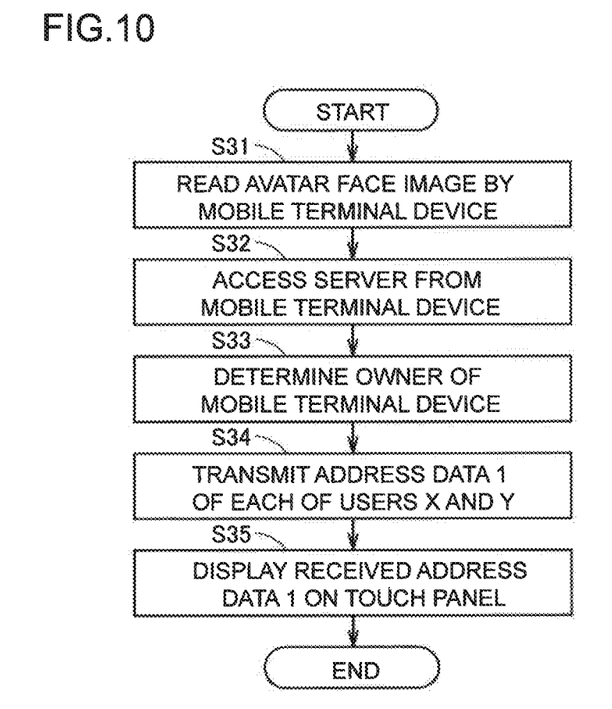
FIG. 10 is a flowchart illustrating a flow of processing when a delivery fee is calculated.

Next, collection of a delivery fee will be described. FIG. 10 is a flowchart illustrating a flow of processing when a delivery fee is calculated. With reference to FIG. 1 to FIG. 10, first, the avatar face image 49 of the sending source and the avatar face image data 47b of the sending destination are read by the mobile terminal device image reading unit 56 included in the mobile terminal device 51b owned by the store clerk T at the convenience store (S31). Then, the server 41 is accessed from the mobile terminal device 51b (S32). Specifically, a user ID and a password of the store clerk T who owns the mobile terminal device 51b are input to the mobile terminal device 51b and are transmitted to the server 41 with image information that has been read. The server 41 authenticates an access from the mobile terminal device 51b, and then, determines who owns the mobile terminal device 51b (S33). In this case, it is determined that the mobile terminal device 51b is owned by the store clerk T at the convenience store. Then, the address data 1 of each of the users X and Y that correspond to the avatar face images 49 and 47b is transmitted to the mobile terminal device 51b on the basis of a data disclosure right granted to the store clerk T, which has been set (S34). In this case, the address data 2 of each of the users X and Y is not transmitted. That is, among data stored in the storage area 45, the address data 1 is transmitted but the address data 2 is not transmitted. Specifically, address data up to a city, a ward, a town, or a village is transmitted but address data up to a street number is not transmitted. In this case, even without knowing a detailed location, such as a street number or the like, of the address, the store clerk T is able to calculate a delivery fee on the basis of information of the address data 1 which has been obtained.

The mobile terminal device 51b displays the address data 1 that has been transmitted from the server 41 on the touch panel 55 (S35). The store clerk T knows an address up to a city, a ward, a town, or a village and calculates a delivery fee. The delivery fee is charged to the user X of the sending source, for example, at the convenience store. For the delivery fee, if a flat-rate system is applied to a municipality level, even without knowing information of a detailed address, that is, for example, a specific street number or the like, of each of the user X of the sending source and the user Y of the sending destination, the store clerk T is able to calculate a delivery fee. Therefore, also in this case, there is no need to let the store clerk T at the convenience store know an address up to a street number, and therefore, secrecy of individual information is high.

Note that, when a procedure of delivering the delivery article Z to the user Y by the user X is completed, the server 41 sends an email to the mobile terminal device 51a owned by the user Y. Specifically, the user Y is notified via an email from the server 41 that the procedure of delivering the delivery article Z from the user X to the user Y has been performed.

The user Y who owns the mobile terminal device 51a receives an email from the server 41. Thus, the user Y is able to confirm that the delivery article Z has been sent from the user X.

Next, a case after delivery of the delivery article Z to which the report 66 that has been printed is attached in the above-described manner is started will be described. That is, a flow of processing of an operation after delivery of the delivery article Z is started, which is illustrated in the part 29b, will be described.

Figure 11:
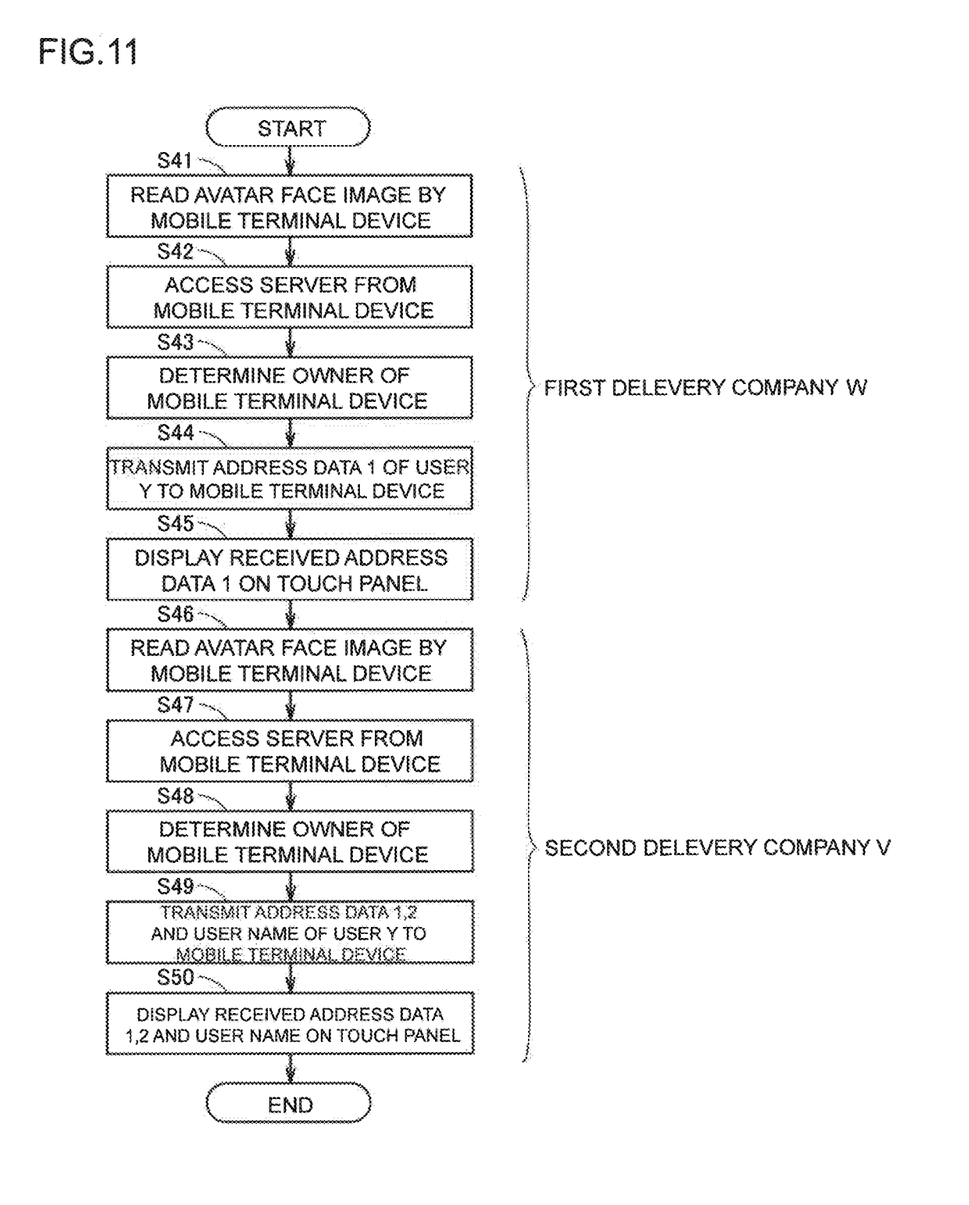
FIG. 11 is a flowchart illustrating a flow of processing when a delivery article is delivered.

FIG. 11 is a flowchart illustrating a flow of processing when the delivery article Z is delivered. The delivery article Z to which the report 66 is attached is first delivered by the first delivery company W which owns the mobile terminal device 51c to the corresponding city, ward, town, or village. Then, the delivery article Z is delivered by the second delivery company V which owns the mobile terminal device 51d to the user Y who is a final sending destination.

With reference to FIG. 1 to FIG. 11, first, the avatar face image data 47b of the sending destination is read by the mobile terminal device 51c owned by the first delivery company W the delivery service area of which includes the address of the user X of the sending source (S41). Then, the server 41 is accessed from the mobile terminal device 51c (S42). Specifically, a user ID and a password of the first delivery company W which owns the mobile terminal device 51c are input to the mobile terminal device 51c and are transmitted to the server 41 with image data that has been read. The server 41 authenticates an access from the mobile terminal device 51c, and then, determines who owns the mobile terminal device 51c (S43). In this case, the server 41 determines that the mobile terminal device 51c is owned by the first delivery company W. Then, the server 41 transmits the address data 1 of the user Y that corresponds to the avatar face image data 47b to the mobile terminal device 51c on the basis of a data disclosure right granted to the first delivery company W (S44). In this case, the address data 2 is not transmitted. In this case, for the first delivery company W, disclosure of a final part, that is, a street number, of an address is not permitted, but disclosure of other parts of the address, that is, an address at the prefecture or city, town, or village level is permitted. Therefore, the delivery article Z is delivered to the second delivery company V the delivery service area of which includes the address of the user Y of the sending destination at the city, town, or village level from the first delivery company W on the basis of information of the address data 1 which has been transmitted. Furthermore, in this case, data related to the user X is not disclosed to the first delivery company W. Therefore, secrecy of individual information is increased.

The mobile terminal device 51c displays the address data 1 that has been received on the touch panel 55 (S45). The first delivery company W delivers the delivery article Z to the second delivery company V which manages the address data 1 as a delivery destination on the basis of the address data 1 that is displayed.

After the delivery article Z is passed from the first delivery company W to the second delivery company V, the avatar face image data 47b of the sending destination is read by the mobile terminal device 51d owned by the second delivery company V (S46). Then, the server 41 is accessed from the mobile terminal device 51d (S47). Specifically, a user ID and a password of the second delivery company V which owns the mobile terminal device 51d are input to the mobile terminal device 51d and are transmitted to the server 41 with image information that has been read. The server 41 authenticates an access from the mobile terminal device 51d, and then, determines who owns the mobile terminal device 51d (S48). In this case, the server 41 determines that the mobile terminal device 51d is owned by the second delivery company V. Then, the address data 1, the address data 2, and a user name of the user Y that corresponds to the avatar face image data 47b are transmitted to the mobile terminal device 51d on the basis of a data disclosure right granted to the second delivery company V, which has been set (S49). That is, the detailed address and the user name of the user Y that is the final sending destination are disclosed to the second delivery company V which finally delivers the delivery article Z to the user Y of the sending destination. Therefore, the second delivery company V is able to reliably deliver the delivery article Z to the user Y that is the final sending destination. Note that, in this case, information related to the user X is not disclosed to the second delivery company V. Therefore, secrecy of individual information is increased.

The mobile terminal device 51d displays the address data 1, the address data 2, and the user Y that is the user name which have been received on the touch panel 55 (S50). The second delivery company V delivers the delivery article Z to the user Y on the basis of the address data 1, the address data 2, and the user name that are displayed and passes the delivery article Z to the user Y.

Figure 12:
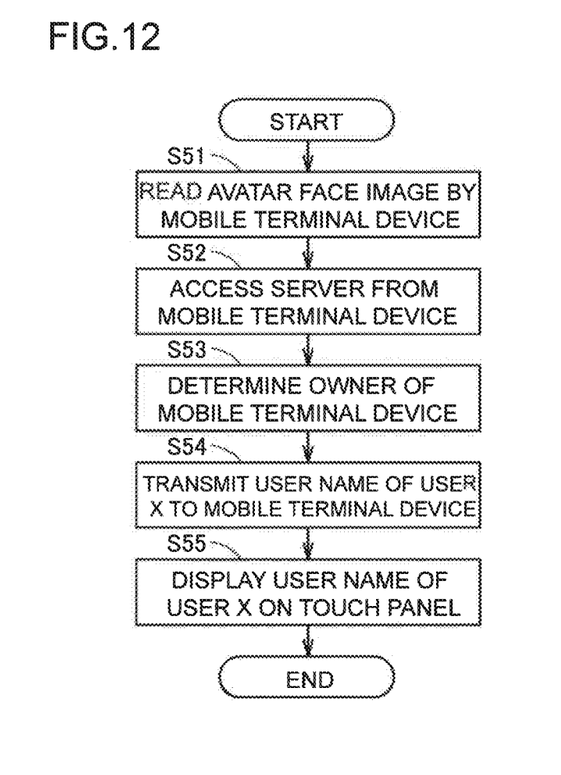
FIG. 12 is a flowchart illustrating a flow of processing when a user receives a delivery article.

Next, a case in which the user Y of the sending destination receives the delivery article Z will be described. FIG. 12 is a flowchart illustrating a flow of processing when the user Y receives the delivery article Z.

With reference to FIG. 1 to FIG. 12, the second delivery company V that is a final delivery company goes to the address of the user Y and passes the delivery article Z to the user Y. In this case, the user Y checks the sending source of the delivery article Z. That is, the avatar face image 49 of the sending source is read by the mobile terminal device 51a owned by the user Y (S51). Then, the server 41 is accessed from the mobile terminal device 51a (S52). Specifically, a user ID and a password of the user Y who owns the mobile terminal device 51a are input to the mobile terminal device 51a and are transmitted to the server 41 with image information that has been read. The server 41 authenticates an access from the mobile terminal device 51a, and then, determines who owns the mobile terminal device 51a (S53). In this case, the server 41 determines that the mobile terminal device 51a is owned by the user Y of the sending destination. Then, the server 41 transmits a user name of the user X of the sending source that corresponds to the avatar face image 49 to the mobile terminal device 51a on the basis of a data disclosure right granted to the user Y, which has been set (S54). The mobile terminal device 51a displays the user X which is the user name that has been received on the touch panel 55 (S55). That is, the user name of the user X of the sending source is disclosed to the user Y. Therefore, the user Y is able to refer to contents of an email that has been previously sent from the server 41 in past and know that the delivery article Z has been sent from the user X.

That is, using the delivery management system 27, the server 41 receives delivery-related data, which has been input via the input unit 62a included in the multifunction peripheral 11 or the like and has been transmitted, grants the mobile terminal devices 51a to 51d data disclosure rights on the basis of the delivery-related data, and generates image data on the basis of the delivery-related data. Then, the generated image data is transmitted to the multifunction peripheral 11. The multifunction peripheral 11 generates an image on the basis of the image data that has been received and prints a delivery report. The delivery companies which own the mobile terminal devices 51c and 51d read the image data and access the server 41 so that disclosure contents of the data in accordance with the data disclosure rights are disclosed, and thereby, the delivery companies deliver a delivery article to the user Y of the sending destination. In this case, the delivery-related data is printed as image data, and therefore, even when a third person looks at the image data, individual information, such as a user name or the like, is not known. Also, the delivery article is delivered to the user Y of the sending destination with the disclosure contents in accordance with the data disclosure rights, and therefore, detailed individual information is not unnecessarily disclosed to the delivery companies and the delivery article may be reliably delivered to the user Y of the sending destination. Therefore, using the delivery management system 27, secrecy of individual information may be increased and goods may be reliably delivered.

In this case, an email is sent from the server 41 to the mobile terminal device 51a owned by the user Y, and therefore, it may be reliably known that delivery of the delivery article Z from the user X of the sending source is in process.

Also, in the above-described embodiment, for example, when the first and second delivery companies W and V are not able to arrive the address of the user Y, data, such as a telephone number of the user Y or the like, may be disclosed in accordance with accesses to the server 41 from the mobile terminal device 51c and 51d, which have been made again.

Note that, although, in the above-described embodiment, as image information, an avatar face image is used, the present disclosure is not limited thereto, a two-dimensional bar code, an QR code (a registered trademark), a photographic image, an encrypted image data, or the like may be used.

Also, in the above-described embodiment, if not particularly necessary, an email that notifies the mobile terminal device 51a owned by the user Y that the delivery article Z is sent from the user X does not have to be transmitted from the server 41 to the mobile terminal device 51a.

Note that, in the above-described embodiment, in a case in which a delivery fee is a flat rate or the like, when it is possible to know the delivery fee, a calculation of a delivery fee using a mobile terminal device does not have to be performed. Also, when delivery is performed by a single delivery company, only one delivery company which is able to know an address of a final sending destination may serve as the delivery company that performs the delivery.

Also, although, in the above-described embodiment, as the notifying unit, the touch panel displays delivery-related data that is transmitted from the server 41 on the basis of a granted data disclosure right, the present disclosure is not limited thereto, and the delivery-related data may be notified by a sound. As a matter of course, the delivery-related data may be notified by a sound in addition to display.

The embodiment and examples disclosed herein are provided merely for illustrative purpose in every respect and are not intended to be limiting in any aspect. The scope of the present disclosure is defined by the scope of claims rather than the above-described description, and is intended to include any modifications within the scope and meaning equivalent to the terms of the claims.

INDUSTRIAL APPLICABILITY

A delivery management system according to the present disclosure is effectively used particularly when secrecy of individual information of a user of a sending source and a user of a sending destination and confirmation by the user of the sending destination on whether or not delivery of goods is reliable delivery from the user of the sending source in a simple manner are required.

What is claimed is:

1. A delivery management system, which includes: an image forming device that forms an image, a server that is communicable with the image forming device, and a plurality of mobile terminal devices that are communicable with the server, and delivers a delivery article from a user of a sending source to a user of a sending destination, wherein the image forming device includes:
an input unit via which delivery-related data is input,
an image forming device transmitting unit that transmits the delivery-related data which has been input to the input unit to the server,
an image forming device receiving unit that receives image data that is transmitted from the server, and
a printing unit that forms a delivery image on the basis of the image data which has been received by the image forming device receiving unit and prints a delivery report of the delivery article, the server includes:
a server receiving unit that receives data that is transmitted from the image forming device and the plurality of mobile terminal devices,
an authentication unit that authenticates an access from the image forming device and the plurality of mobile terminal devices,
a storage unit that stores data related to a user, which includes: a user name, first address data of an address of the user, and second address data of the address of the user that is different from the first address data and is more detailed than the first address data, and enables identification of the address of the user when referred to together with the first address data,
an authorization unit that grants the plurality of mobile terminal devices a data disclosure right on the basis of the delivery-related data which has been received by the server receiving unit, each of the plurality of mobile terminal devices being granted a different data disclosure right,
an image data generation unit that generates image data on the basis of the delivery-related data which has been received by the server receiving unit, and
a server transmitting unit that transmits data to the image forming device and the plurality of mobile terminal devices, and each of the plurality of mobile terminal devices includes:
a mobile terminal device image reading unit that reads the delivery image,
a mobile terminal device image transmitting unit that transmits image data of the delivery image which has been read by the mobile terminal device image reading unit to the server,
a mobile terminal device image receiving unit that receives data that is transmitted from the server, and
a notifying unit that displays a notification of the delivery-related data which is transmitted from the server on the basis of the data disclosure right granted to the mobile terminal device, wherein the server transmitting unit transmits the first address data of the user of the sending source and the user of the sending destination and the second address data of the user of the sending destination, or both the first address data and the second address data of the user of the sending destination to the each of the plurality of mobile terminal devices in accordance with the right granted by the authorization unit, and the image data generated by the image data generation unit includes an avatar face image of the user and a key image data in a background of the avatar face image, the key image data comprising image data of a generation time and a randomly generated invoice number of the delivery report.

2. The delivery management system according to claim 1, wherein the notifying unit includes a touch panel.

3. The delivery management system according to claim 1, wherein, when the server receives the delivery-related data, the server transmits an email to the mobile terminal device that is owned by the user of a sending destination.

4. The delivery management system according to claim 1, wherein when the authentication unit successfully authenticates an access from the mobile terminal device that is associated with the user of the sending destination, the server transmitting unit transmits the data of the user name of the sending source to the mobile terminal device which made the access, and
the notifying unit displays a notification of the data of the user name of the sending source received by the mobile terminal device receiving unit.

* * * * *